US008886552B2

(12) United States Patent
Finkelstein et al.

(10) Patent No.: US 8,886,552 B2
(45) Date of Patent: Nov. 11, 2014

(54) METHOD AND SYSTEM FOR ONLINE USER FEEDBACK ON WEBSITES AND SOFTWARE

(75) Inventors: Ariel Finkelstein, Zichron Yaakov (IL); Eran Savir, Hod Hasharon (IL); Eylon Steiner, Ra'anana (IL)

(73) Assignee: Kampyle Ltd., Ramat Gan (IL)

( * ) Notice: Subject to any disclaimer, the term of this patent is extended or adjusted under 35 U.S.C. 154(b) by 29 days.

(21) Appl. No.: 13/001,951

(22) PCT Filed: Jul. 7, 2010

(86) PCT No.: PCT/IL2010/000543
§ 371 (c)(1),
(2), (4) Date: Dec. 29, 2010

(87) PCT Pub. No.: WO2011/004368
PCT Pub. Date: Jan. 13, 2011

(65) Prior Publication Data
US 2012/0123823 A1        May 17, 2012

Related U.S. Application Data

(60) Provisional application No. 61/270,369, filed on Jul. 7, 2009.

(51) Int. Cl.
*G06Q 10/00* (2012.01)
*G06Q 30/00* (2012.01)

(52) U.S. Cl.
USPC ........................................ 705/7.32; 705/7.29

(58) Field of Classification Search
USPC ............................................... 705/7.11–7.42
See application file for complete search history.

(56) References Cited

U.S. PATENT DOCUMENTS

| | | | |
|---|---|---|---|
| 5,566,291 A * | 10/1996 | Boulton et al. | 715/709 |
| 6,421,724 B1 | 7/2002 | Nickerson et al. | |
| 6,606,581 B1 | 8/2003 | Nickerson et al. | |
| 6,785,717 B1 | 8/2004 | Nickerson et al. | |
| 6,928,392 B2 | 8/2005 | Nickerson et al. | |
| 7,085,820 B1 | 8/2006 | Nickerson et al. | |
| 7,370,285 B1 | 5/2008 | Nickerson et al. | |
| 7,478,121 B1 | 1/2009 | Nickerson et al. | |
| 2004/0030697 A1 * | 2/2004 | Cochran et al. | 707/9 |
| 2004/0039990 A1 * | 2/2004 | Bakar et al. | 715/505 |

(Continued)

FOREIGN PATENT DOCUMENTS

WO    WO 2011/004368        1/2011

OTHER PUBLICATIONS

DeveloperZen "Introducing Kampyle—The Next Generation of Online Feedback" (http://www.developerzen.com/2008/02/19/introducing-kampyle-the-next-generation-of-online-feedback/) Feb. 19, 2008.*

(Continued)

*Primary Examiner* — Sujay Koneru
(74) *Attorney, Agent, or Firm* — Vladimir Sherman; Professional Patent Solutions

(57) ABSTRACT

A system for collecting and analyzing structured user feedback on websites, the system including website user structured feedback form generation functionality operative to generate structured feedback forms for providing website user feedback on website user interaction with a website-based process and website user feedback analyzing functionality operative to automatically collect and analyze website user feedback entered in the structured feedback forms and to provide at least one analysis report based on feedback from a multiplicity of website users.

19 Claims, 16 Drawing Sheets

(56) References Cited

U.S. PATENT DOCUMENTS

| | | |
|---|---|---|
| 2005/0154693 A1 | 7/2005 | Ebert |
| 2007/0198368 A1* | 8/2007 | Kannan et al. ............... 705/26 |
| 2007/0198459 A1* | 8/2007 | Boone et al. ................. 707/1 |
| 2008/0071602 A1* | 3/2008 | Ojakaar et al. ............... 705/10 |
| 2008/0092060 A1 | 4/2008 | Berg et al. |
| 2008/0201206 A1* | 8/2008 | Pokorney et al. ............ 705/10 |
| 2009/0013068 A1* | 1/2009 | Eaglestone et al. .......... 709/224 |
| 2009/0228789 A1* | 9/2009 | Brugler et al. ............... 715/700 |

OTHER PUBLICATIONS

An International Search Report dated Nov. 3, 2010, which issued during the prosecution of Applicant's PCT/IL10/00543.

* cited by examiner

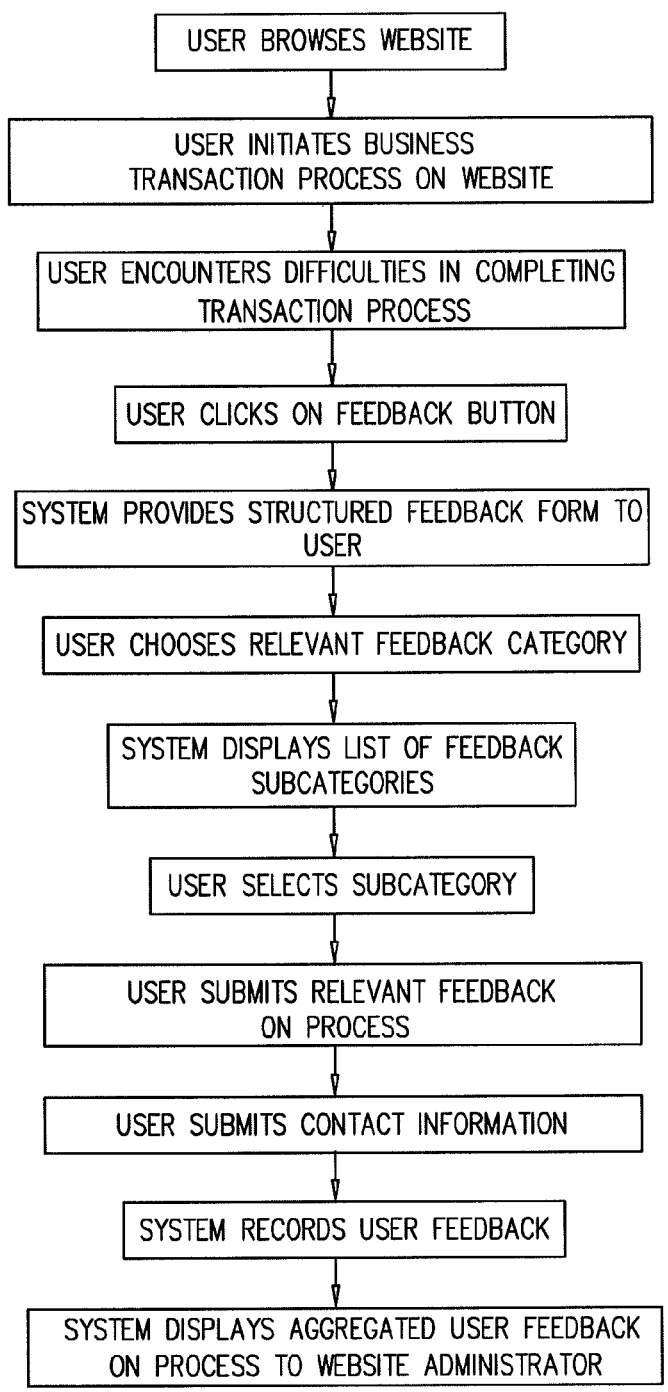

FIG. 3D

Feedback

Why did you cancel the transaction process?

- Usability Issues
- Security Issues
- Suggestions

Select a relevant issue

Browser not supported    Address form
Can't log in
Site content

[Send] [Cancel]

FIG. 3E

Feedback

- Usability Issues
- Site content
- Suggestions

Address form

☑ MY COUNTRY IS NOT IN THE LIST OF COUNTRIES
☐ ADDRESS FORM DOES NOT ALLOW FOR PROVIDING A POST OFFICE BOX

[Send] [Cancel]

FIG. 3F

Contact Information

Name: Rajib Ghandi

Telephone: (000) 352-8765

Email: Rajib-Ghandi@ghandi.com

Address: Canning Road, New Delhi, India

[Send] [Cancel]

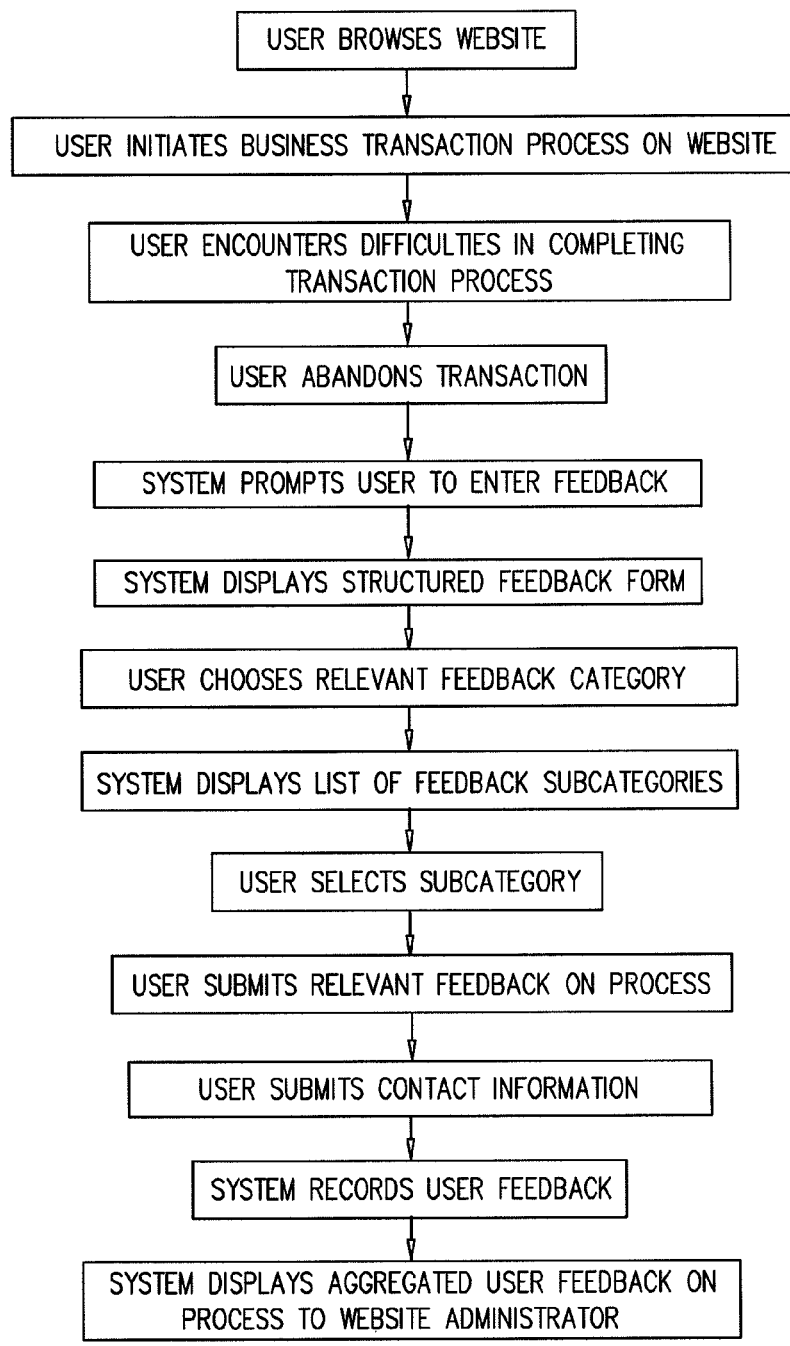

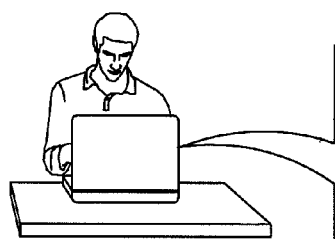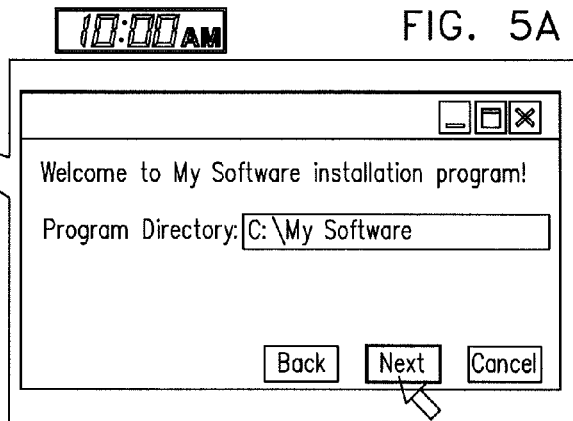
FIG. 5A
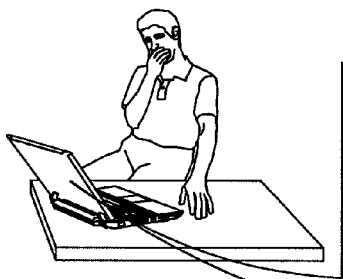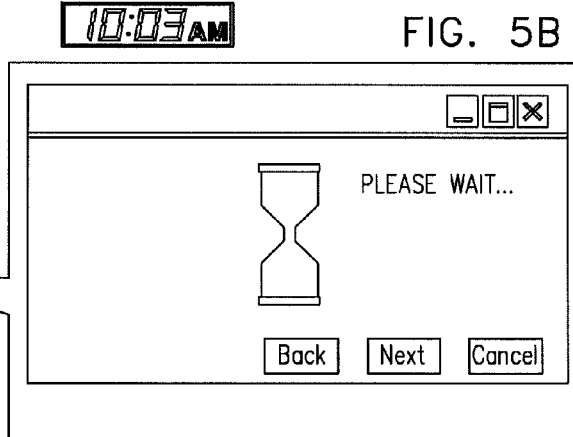
FIG. 5B
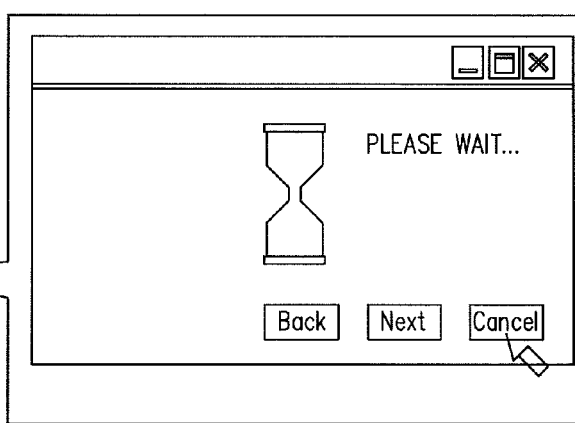
FIG. 5C

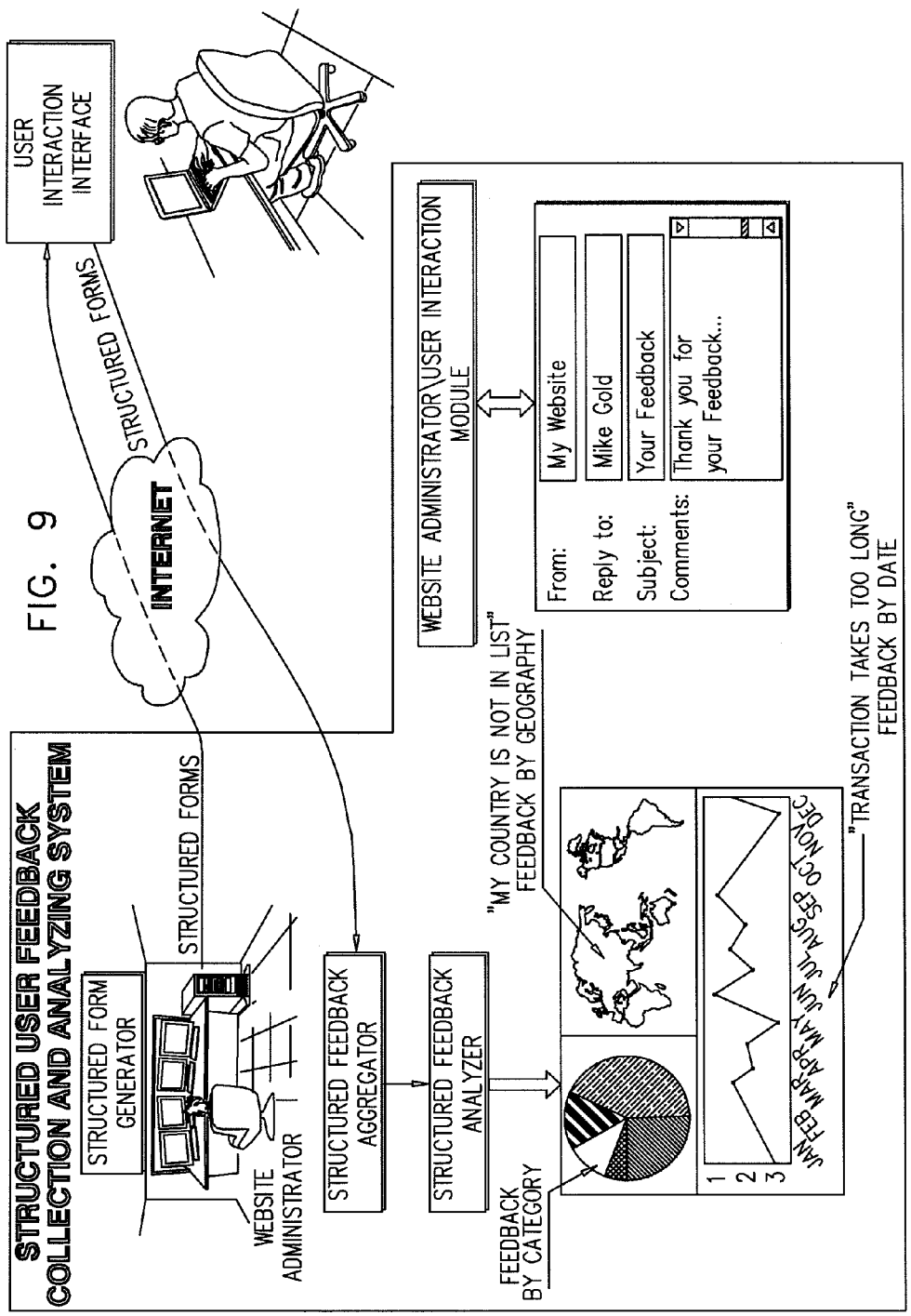

METHOD AND SYSTEM FOR ONLINE USER FEEDBACK ON WEBSITES AND SOFTWARE

REFERENCE TO RELATED APPLICATIONS

Reference is made to U.S. Provisional Patent Application Ser. No. 61/270,369, filed Jul. 7, 2009 and entitled "METHOD AND SYSTEM FOR ONLINE USER FEEDBACK ON WEBSITES AND SOFTWARE", the disclosure of which is hereby incorporated by reference and priority of which is hereby claimed pursuant to 37 CFR 1.78(a) (4) and (5)(i).

FIELD OF THE INVENTION

The present invention relates to systems and methods for collecting and using user feedback on websites and software installations.

BACKGROUND OF THE INVENTION

The following patent publications are believed to represent the current state of the art:
U.S. Pat. Nos. 6,421,724; 6,606,581; 6,785,717; 6,928,392; 7,085,820; 7,370,285 and 7,478,121.

SUMMARY OF THE INVENTION

The present invention seeks to provide improved systems and methods for collecting and analyzing user feedback on websites and software installations.

There is thus provided in accordance with a preferred embodiment of the present invention a system for collecting and analyzing structured user feedback on websites, the system including website user structured feedback form generation functionality operative to generate structured feedback forms for providing website user feedback on website user interaction with a website-based process and website user feedback analyzing functionality operative to automatically collect and analyze website user feedback entered in the structured feedback forms and to provide at least one analysis report based on feedback from a multiplicity of website users.

Preferably, the website user structured feedback form generation functionality is operative automatically to provide structured feedback forms whose content depends on a stage in the website-based process currently being executed by the website user. Additionally or alternatively, the website user structured feedback form generation functionality is operative to provide a plurality of structured feedback forms which correspond to a plurality of stages in the website-based process.

In accordance with a preferred embodiment of the present invention the website user structured feedback form generation functionality includes website specification functionality operative to permit a website administrator to design a plurality of structured feedback forms which correspond to a plurality of stages in the website-based process corresponding to a specific website. Additionally or alternatively, the structured feedback forms include a plurality of website user selectable items, whose selection by a website user indicates specific website user feedback.

Preferably, the structured feedback forms do not include a freetext response item. Alternatively, the structured feedback forms do include a freetext response item.

In accordance with a preferred embodiment of the present invention the website user feedback analyzing functionality is operative automatically to provide at least one analysis report which indicates proportions of website users who provide various pre-classified types of feedback. Additionally or alternatively, the website user feedback analyzing functionality is operative automatically to provide at least one analysis report which indicates proportions of website users who provide various pre-classified types of feedback at various stages in the website process.

Preferably, the website user feedback analyzing functionality is operative automatically to provide contact information for website users providing feedback so as to enable the website administrator to respond to the feedback.

There is also provided in accordance with another preferred embodiment of the present invention a method for collecting and analyzing structured user feedback on websites, the method including generating website user structured feedback forms for receiving website user feedback on website user interaction with a website-based process, automatically collecting and analyzing the website user feedback entered in the structured feedback forms and providing at least one analysis report based on the website user feedback from a multiplicity of website users.

Preferably, the generating includes automatically providing structured feedback forms whose content depends on a stage in the website-based process currently being executed by the website user. Alternatively or additionally, the generating includes providing a plurality of structured feedback forms which correspond to a plurality of stages in the website-based process.

In accordance with a preferred embodiment of the present invention, the generating includes permitting a website administrator to design a plurality of structured feedback forms which correspond to a plurality of stages in the website-based process corresponding to a specific website. Additionally or alternatively, the structured feedback forms include a plurality of website user selectable items, whose selection by a website user indicates specific website user feedback.

Preferably, the structured feedback forms do not include a freetext response item. Alternatively, the structured feedback forms do include a freetext response item.

In accordance with a preferred embodiment of the present invention, the providing at least one analysis report includes automatically providing at least one analysis report which indicates proportions of website users who provide various pre-classified types of feedback. Additionally or alternatively, the providing at least one analysis report includes automatically providing at least one analysis report which indicates proportions of website users who provide various pre-classified types of feedback at various stages in the website process.

Preferably, the automatically collecting and analyzing includes automatically providing contact information for website users providing feedback so as to enable the website administrator to respond to the feedback.

There is further provided in accordance with yet another preferred embodiment of the present invention a system for collecting and analyzing structured user feedback on software installations, the system including software installation user structured feedback form generation functionality operative to generate structured feedback forms for providing software installation user feedback on software installation user interaction with a software installation process and software installation user feedback analyzing functionality operative to automatically collect and analyze software installation user feedback entered in the structured feedback forms and to provide at least one analysis report based on feedback from a multiplicity of software installation users.

Preferably, the software installation user structured feedback form generation functionality is operative automatically to provide structured feedback forms whose content depends on a stage in the software installation process currently being executed by the software installation user. Additionally or alternatively, the software installation user structured feedback form generation functionality is operative to provide a plurality of structured feedback forms which correspond to a plurality of stages in the software installation process.

In accordance with a preferred embodiment of the present invention the software installation user structured feedback form generation functionality includes software installation specification functionality operative to permit a software installation administrator to design a plurality of structured feedback forms which correspond to a plurality of stages in the software installation process corresponding to a specific software installation. Additionally or alternatively, the structured feedback forms include a plurality of software installation user selectable items, whose selection by a software installation user indicates specific software installation user feedback.

Preferably, the structured feedback forms do not include a freetext response item. Alternatively, the structured feedback forms do include a freetext response item.

In accordance with a preferred embodiment of the present invention the software installation user feedback analyzing functionality is operative automatically to provide at least one analysis report which indicates proportions of software installation users who provide various pre-classified types of feedback. Additionally or alternatively, the software installation user feedback analyzing functionality is operative automatically to provide at least one analysis report which indicates proportions of software installation users who provide various pre-classified types of feedback at various stages in the software installation process.

Preferably, the software installation user feedback analyzing functionality is operative automatically to provide contact information for software installation users providing feedback so as to enable the software installation administrator to respond to the feedback.

There is yet further provided in accordance with still another preferred embodiment of the present invention a method for collecting and analyzing structured user feedback on software installations, the method including generating software installation user structured feedback forms for receiving software installation user feedback on software installation user interaction with a software installation process, automatically collecting and analyzing the software installation user feedback entered in the structured feedback forms and providing at least one analysis report based on the user feedback from a multiplicity of software installation users.

Preferably, the generating includes automatically providing structured feedback forms whose content depends on a stage in the software installation process currently being executed by the software installation user. Additionally or alternatively, the generating includes providing a plurality of structured feedback forms which correspond to a plurality of stages in the software installation process.

In accordance with a preferred embodiment of the present invention the generating includes permitting a software installation administrator to design a plurality of structured feedback forms which correspond to a plurality of stages in the software installation process corresponding to a specific software installation. Alternatively or additionally, the structured feedback forms include a plurality of software installation user selectable items, whose selection by a software installation user indicates specific software installation user feedback.

Preferably, the structured feedback forms do not include a freetext response item. Alternatively, the structured feedback forms do include a freetext response item.

In accordance with a preferred embodiment of the present invention the providing at least one analysis report includes automatically providing at least one analysis report which indicates proportions of software installation users who provide various pre-classified types of feedback. Additionally or alternatively, the providing at least one analysis report includes automatically providing at least one analysis report which indicates proportions of software installation users who provide various pre-classified types of feedback at various stages in the software installation process.

Preferably, the automatically collecting and analyzing includes automatically providing contact information for software installation users providing feedback so as to enable the software installation administrator to respond to the feedback.

BRIEF DESCRIPTION OF THE DRAWINGS

The present invention will be understood and appreciated more fully from the following detailed description, taken in conjunction with the drawings in which:

FIG. 2 is a simplified flowchart indicating steps associated with using a system which provides structured feedback forms, for providing feedback on a user interaction session with a website-based process;

FIGS. 3A, 3B, 3C, 3D, 3E and 3F are simplified pictorial illustrations of steps in using a structured feedback form for providing feedback on another user interaction session with a website-based process;

FIG. 4 is a simplified flowchart indicating steps associated with using a system which provides structured feedback forms, for providing feedback on another user interaction session with a website-based process;

FIGS. 5A, 5B, 5C, 5D, 5E, 5F, 5G and 5H are simplified pictorial illustrations of steps in using a structured feedback form for providing feedback on a user interaction session with a computer software installation process, constructed and operative in accordance with another preferred embodiment of the present invention;

FIG. 9 is a simplified functional block diagram illustrating the components of a system for collecting and analyzing structured user feedback on websites, constructed and operative in accordance with a preferred embodiment of the present invention.

DETAILED DESCRIPTION OF PREFERRED EMBODIMENTS

Reference is now made to FIGS. 1A, 1B, 1C, 1D, 1E, 1F and 1G, which are simplified pictorial illustrations of steps in using a structured feedback form for providing feedback on a user interaction session with a website-based process, constructed and operative in accordance with a preferred embodiment of the present invention. The structured feedback form is a particular feature of a system for collecting and analyzing structured user feedback on websites which comprises website user feedback form generation functionality operative to generate structured feedback forms for providing user feedback on user interaction with website-based process, and website user feedback analyzing functionality operative to automatically collect and analyze user feedback entered in the structured feedback forms and to provide at least one analysis report based on feedback from a multiplicity of website users.

Throughout, the term "structured feedback form" is defined to mean a form which includes user selectable feedback messages which do not require freetext. Preferably multiple user selectable feedback messages are provided in a categorized and nested structure. Structured feedback forms may additionally invite freetext comments but provide useful feedback even if no freetext is inserted.

Figure 1A:
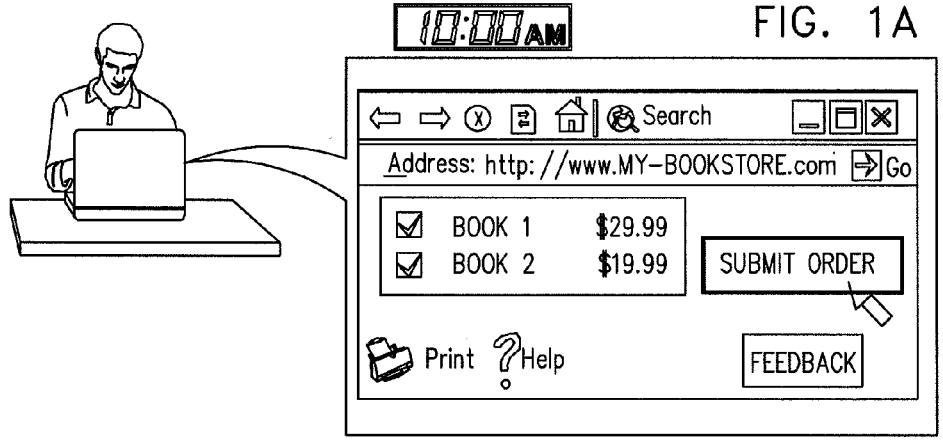
FIGS. 1A, 1B, 1C, 1D, 1E, 1F and 1G are simplified pictorial illustrations of steps in using a structured user feedback form for providing feedback on a user interaction session with a website-based process, constructed and operative in accordance with a preferred embodiment of the present invention.
Figure 1B:
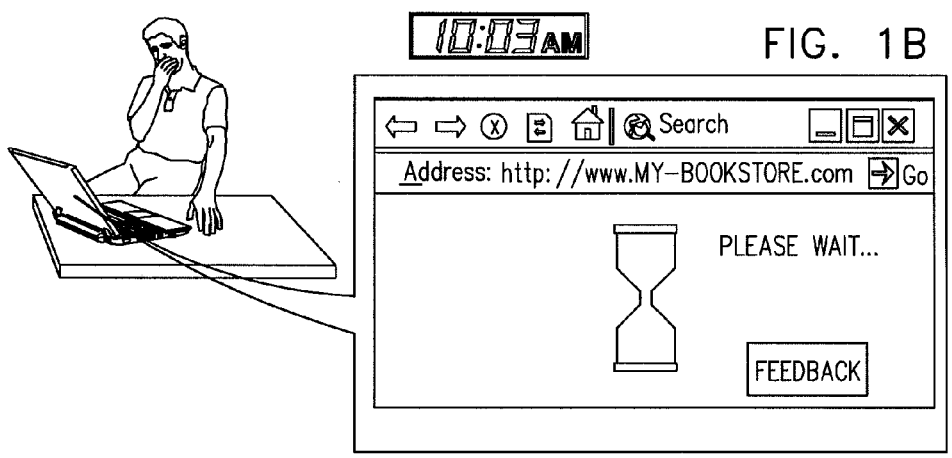
Figure 1C:
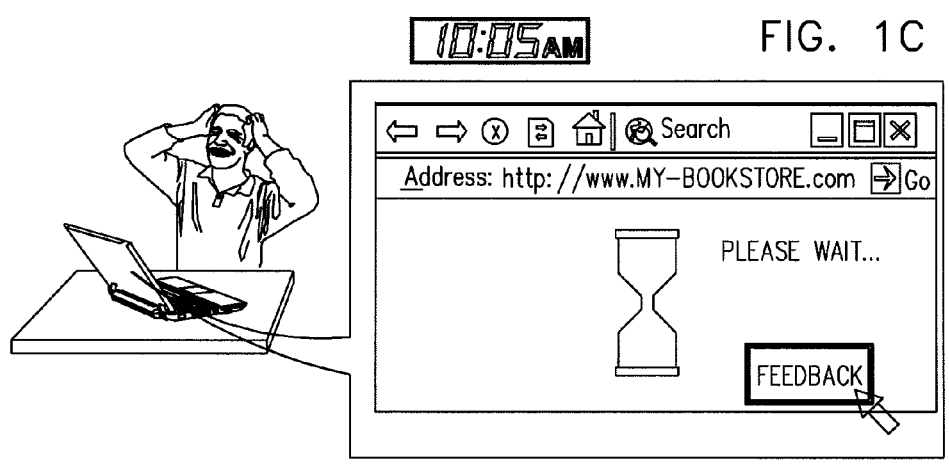
Figure 1D:
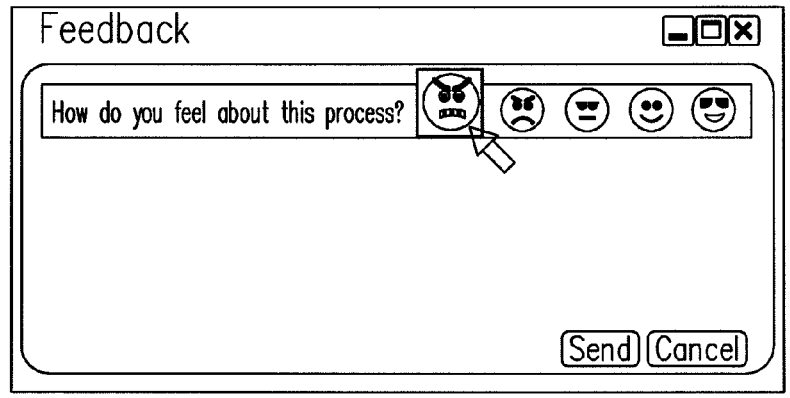

As seen in FIG. 1A, a website user browses a website such as an internet bookstore, and initiates a business transaction process, such as the ordering of books. After selecting the desired books, the user attempts to complete the transaction process at 10:00 AM by clicking on the "submit order" button. As seen in FIG. 1B, at 10:03 AM the website has not yet completed the processing of the transaction. As seen in FIG. 1C, at 10:05 AM the user has still not received confirmation that the transaction has been processed. The user, clearly frustrated, therefore clicks on the "feedback" button, which causes the system to display a feedback form, as shown in FIG. 1D. As seen in FIG. 1D, the user clicks on an angry face icon in order to provide negative feedback regarding his experience with the website-based transaction process.

Figure 1E:
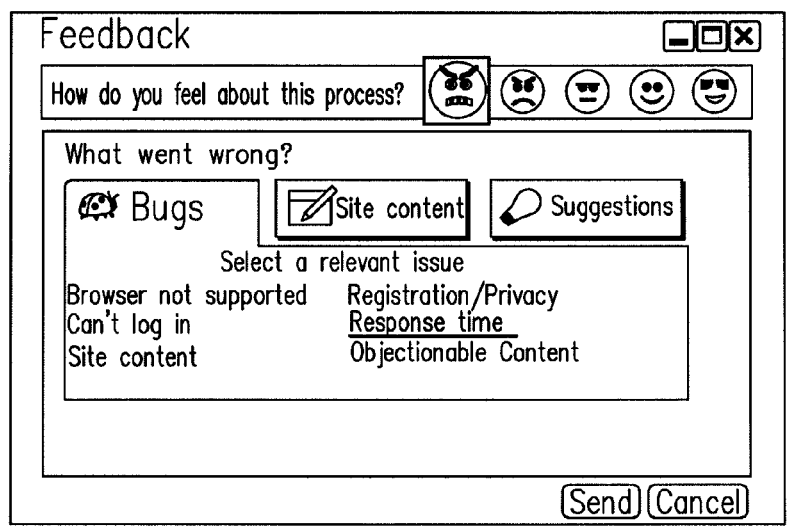

It is a particular feature of the present invention that the system provides the website administrator with the ability to generate categorized and nested structured feedback forms to be displayed on the website for the purpose of collecting feedback regarding the user's experience while navigating through a website-based process. As seen in FIG. 1E, responsive to the user providing negative feedback regarding the user experience with the website-based process, the system provides the user with a list of specific negative feedback categories from which he may choose to more precisely describe his experience with the website-based process, such as feedback relating to bugs, website content or general suggestions. The user selects the "Bugs" category, which includes various negative feedback subcategories, as shown in FIG. 1E. The user then selects the "Response time" subcategory as the most relevant to the problems he has experienced.

Figure 1F:
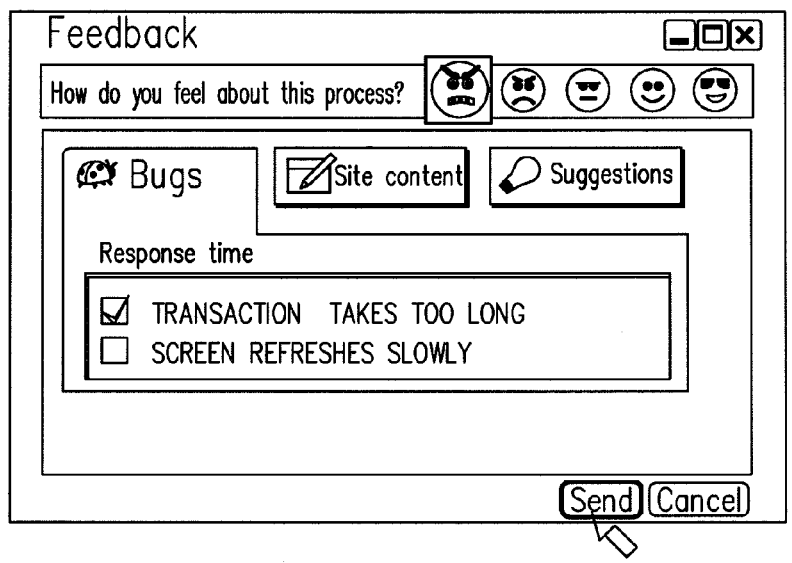
Figure 1G:
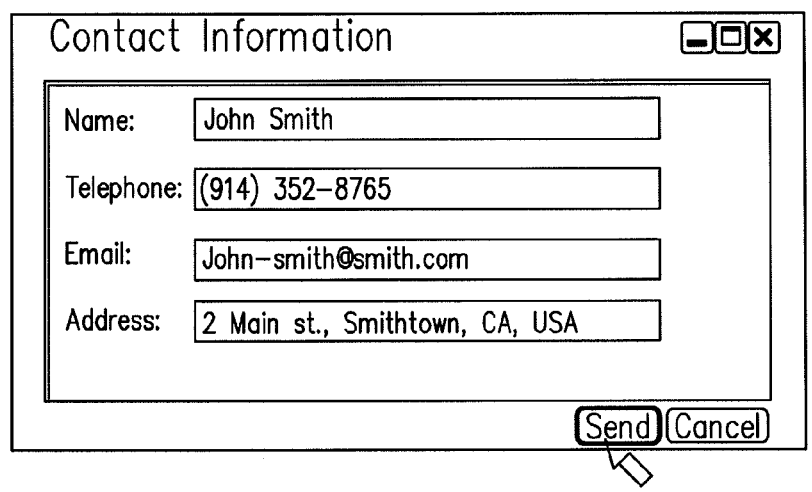

As seen in FIG. 1F, upon selecting the "Response time" subcategory, the user is presented with various more specific feedback options and may select the specific issue he has encountered, such as the length of time that has elapsed while the website has been processing the transaction. To complete the feedback process, the user clicks on the "send" button, after which the system displays to the user a user contact information form, as seen in FIG. 1G.

The contact information form includes fields for entering user contact details such as name, telephone number, email address and address. The user feedback and user contact details are recorded by the system, and allow the website administrator to contact the website user in reply to his feedback. The user contact details may also be used by the system to provide to the website administrator various statistics regarding user feedback.

It is appreciated that although examples of negative feedback are specifically shown in this example, the system and methodology of the present invention applies equally to both positive and negative feedback.

Reference is now made to FIG. 2 which is a simplified flowchart indicating the steps associated with using a system which provides structured feedback forms, for providing feedback on a user interaction session with a website-based process. As seen in FIG. 2, a user browses a website and initiates a business transaction process on the website. Upon encountering difficulties in completing the transaction process, the user clicks on a "feedback" button. The system then presents the user with a structured feedback form comprising feedback categories predefined by the website administrator. The user, in turn, selects a feedback category, and is preferably presented by the system with a list of feedback subcategories predefined by the website administrator. The user then selects a feedback subcategory, and submits relevant feedback. The user also submits user contact information. The system records the user's feedback and contact information, and at a later time may display all aggregated user feedback to the website administrator.

Figure 3A:
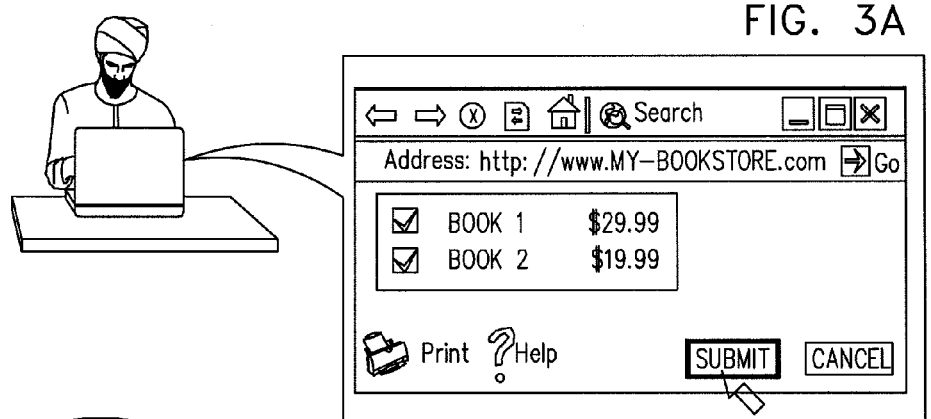
Figure 3B:
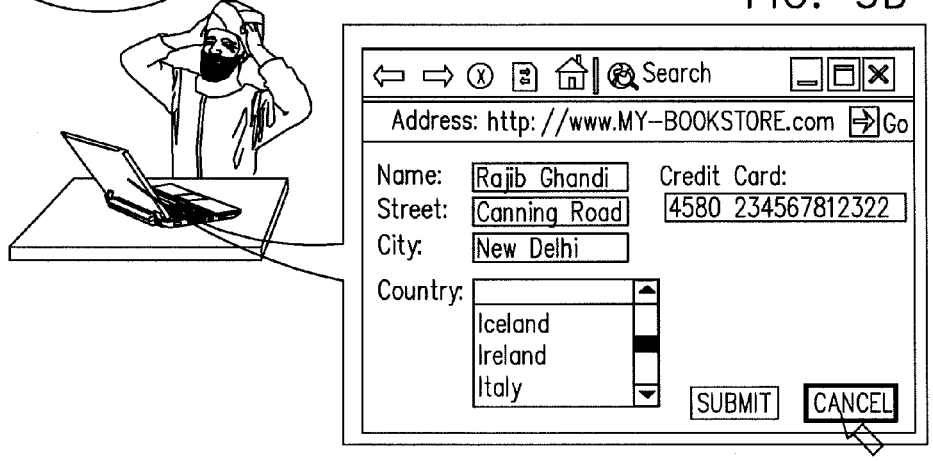
Figure 3C:
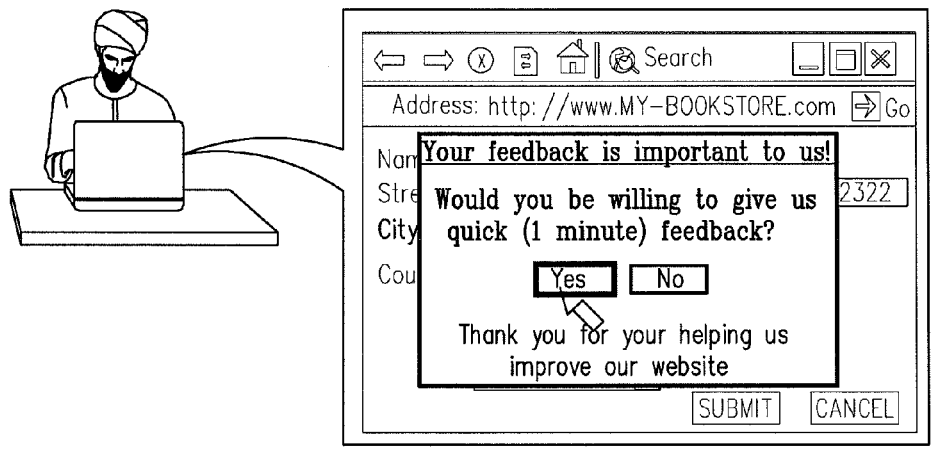

Reference is now made to FIGS. 3A, 3B, 3C, 3D, 3E and 3F which are simplified pictorial illustrations of steps in using a structured feedback form for providing feedback on another user interaction session with a website-based process. As seen in FIG. 3A, a website user browses a website such as an internet bookstore, and initiates a business transaction process such as the ordering of books. After selecting the desired books, the user attempts to complete the transaction process by clicking on the "submit" button. As seen in FIG. 3B, the user is prompted to enter user details such as a credit card number, a name and an address. As seen clearly in FIG. 3B, the user attempts to enter an address in India, however the list of countries provided by the website does not include India. The user therefore decides to terminate the transaction by clicking on the "cancel" button. As shown in FIG. 3C, upon canceling the transaction, the user is prompted by the system which requests that the user fill in a feedback form.

It is a particular feature of the present invention that the system provides the website administrator with the ability to generate categorized and nested structured feedback forms to be displayed on the website for the purpose of collecting feedback regarding the user's experience while navigating through a website-based process. As seen in FIG. 3D, responsive to the user agreeing to fill in a feedback from, the system displays to the user a structured feedback form, questioning the user regarding the reason for terminating the transaction process, and provides the user with a list of specific feedback categories which he may choose from to more precisely describe his reasons for terminating the transaction process, such as feedback relating to usability issues, security issues or general suggestions. The user selects the "Usability Issues" category which includes various feedback subcategories, as shown in FIG. 3D. The user then selects the "Address form" subcategory as the most relevant to the problems he has experienced.

As seen in FIG. 3E, upon selecting the "Address form" subcategory, the user may select the specific issue he has encountered, such as the fact that the list of countries provided by the website does not include the user's country. To complete the feedback process, the user clicks on the "send" button, after which the system displays a user contact information form to the user, as seen in FIG. 3F.

The contact information form includes fields for entering user contact details such as name, telephone number, email address and address. The user feedback and user contact details are recorded by the system, and allow the website administrator to contact the website user in reply to his feedback. The user contact details may also be used by the system to provide to the website administrator various statistics regarding user feedback.

Reference is now made to FIG. 4 which is a simplified flowchart indicating the steps associated with using a system which provides structured feedback forms, for providing feedback on another user interaction session with a website-based process. As seen in FIG. 4, a user browses a website and initiates a business transaction process on the website. Upon encountering difficulties in completing the transaction process, the user abandons the transaction. The system then prompts the user, requesting the user to submit relevant feedback. Upon agreeing to provide feedback, the system then presents to the user a structured feedback form comprising feedback categories predefined by the website administrator. The user, in turn, selects a feedback category, and is preferably presented by the system with a list of feedback subcategories predefined by the website administrator. The user then selects a feedback subcategory, and submits relevant feedback. The user also submits user contact information. The system records the user's feedback and contact information and at a later time may display all aggregated user feedback to the website administrator.

Reference is now made to FIGS. 5A, 5B, 5C, 5D, 5E, 5F, 5G and 5H which are simplified pictorial illustrations of steps in using a structured feedback form for providing feedback on a user interaction session with a computer software installation process, constructed and operative in accordance with another preferred embodiment of the present invention.

Throughout, the term "software installation" is defined to mean the installation of software on a computer and \ or the removal (i.e. uninstall), of software from a computer.

Figure 5D:
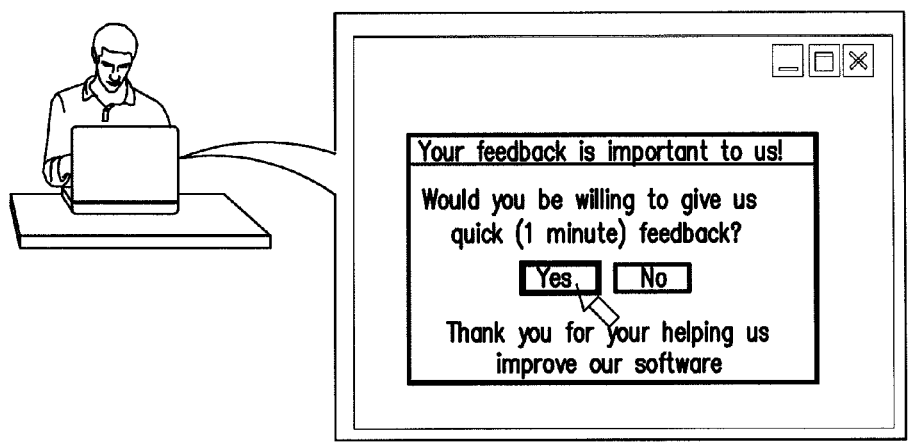
Figure 5E:
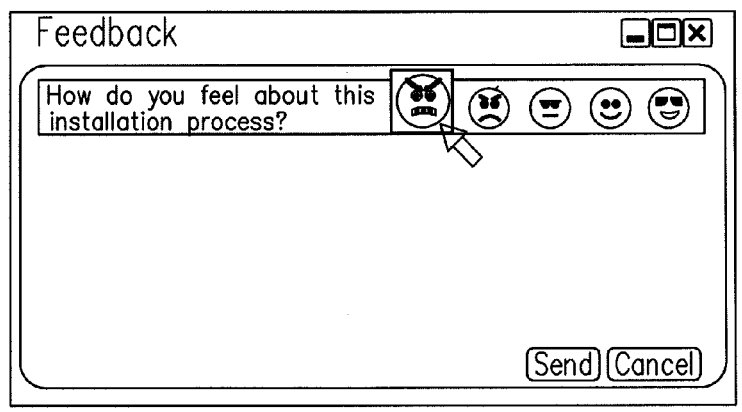

As seen in FIG. 5A, a user initiates a software installation process using a software installation program. After selecting the desired installation directory, the user attempts to continue the installation process at 10:00 AM by clicking on the "next" button. However, as seen in FIG. 5B, at 10:03 AM the software installation program is still requesting that the user wait for the installation program to continue. As seen in FIG. 5C, at 10:05 AM the software installation process has still not yet been resumed. The user therefore decides to terminate the software installation process by clicking on the "cancel" button. As shown in FIG. 5D, responsive to the user canceling the software installation process, the user is prompted by the software installation program, which requests that the user fill in a feedback form. Upon agreeing to fill in a feedback from, the system displays to the user a structured feedback form, as seen in FIG. 5E.

Figure 5F:
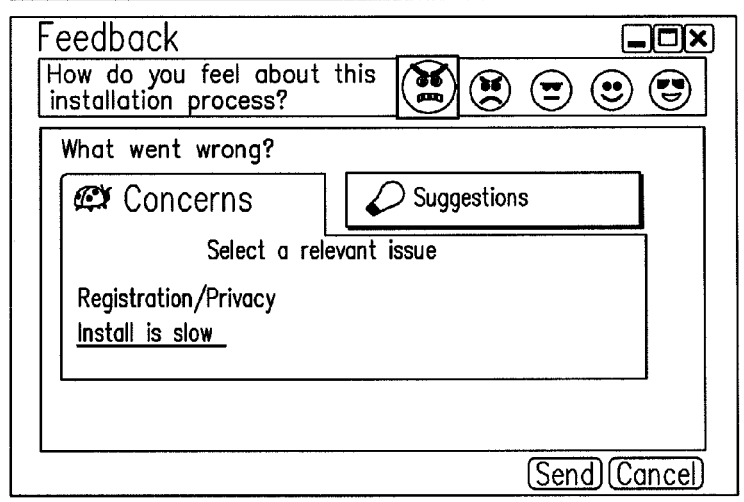

It is a particular feature of the present invention that the system provides the software vendor with the ability to generate categorized and nested structured feedback forms to be displayed in a software installation program for the purpose of collecting feedback regarding the user's experience while navigating through the software installation process. As seen in FIG. 5F, upon choosing to provide negative feedback regarding the user experience with the software installation process, the software installation program provides the user with a list of specific feedback categories from which he may from to more precisely describe his experience with the software installation process, such as "concerns" or "suggestions". The user selects the "concerns" category, which includes various feedback subcategories, as shown in FIG. 5F. The user then selects the "Install is slow" subcategory as the most relevant to the problems he has experienced.

Figure 5G:
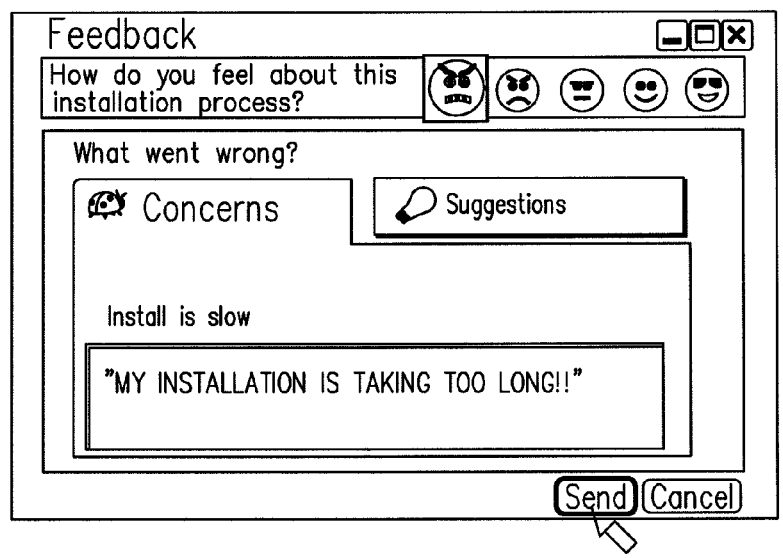
Figure 5H:
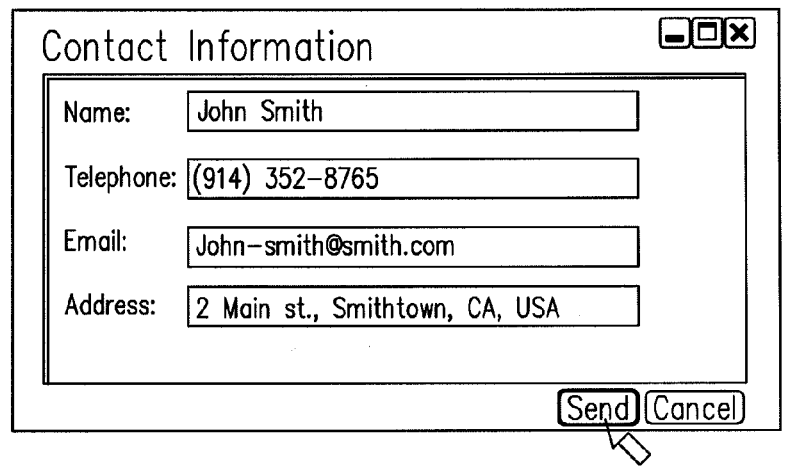

As seen in FIG. 5G, upon selecting the "Install is slow" subcategory, the user may fill in a text field to describe the specific issue he has encountered, such as the fact the software installation process has been running for too long. To complete the feedback process, the user clicks on the "send" button, after which the system displays a user contact information form to the user, as seen in FIG. 5H. The contact information form includes fields for entering user contact details such as name, telephone number, email address and address. The user feedback and user contact details are recorded by the system, and allow the software vendor to contact the user in reply to his feedback. The user contact details may also be used by the system to provide to the software vendor various statistics regarding user feedback.

It is appreciated that although examples of terminating a software installation process are shown, the system and methodology of the present invention applies equally to both software installation and software removal (uninstall), whereby when executing a software removal process, the system may also request that the user provide feedback regarding the reasons for removing the software and user contact details which are recorded by the system.

Figure 6:
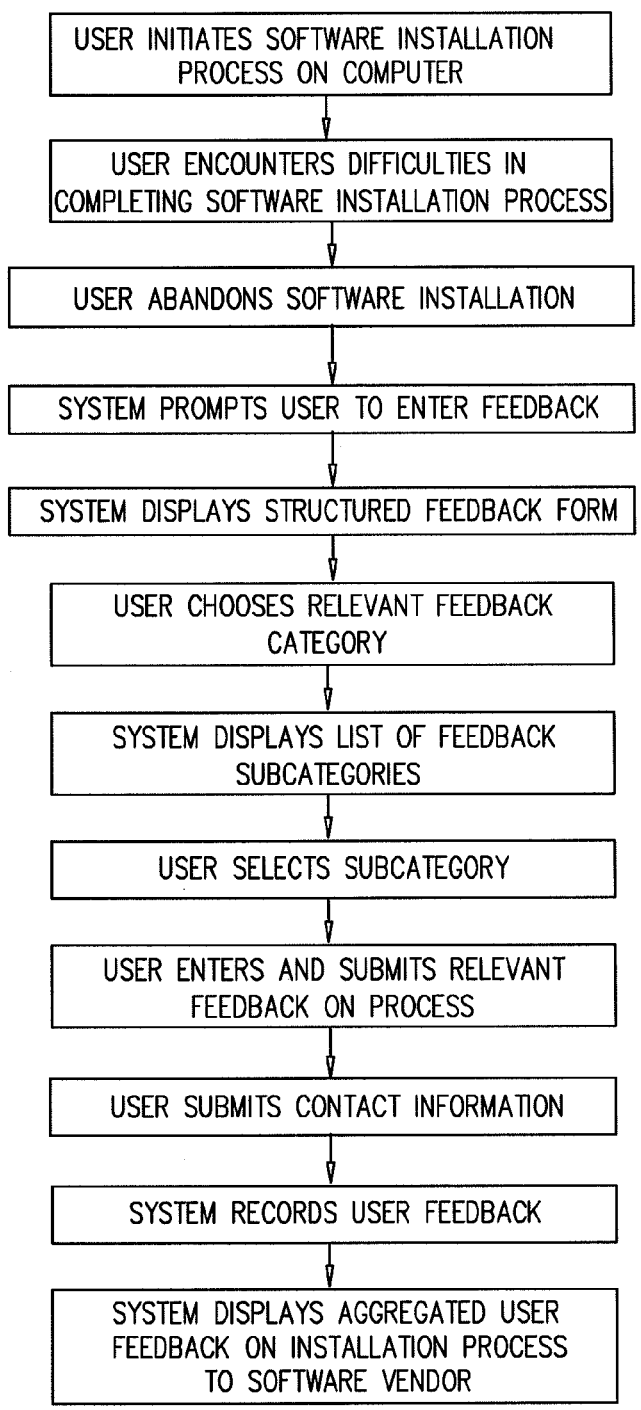
FIG. 6 is a simplified flowchart indicating steps associated with using a system which provides structured feedback forms, for providing feedback on a user interaction session with a computer software installation process.

Reference is now made to FIG. 6 which is a simplified flowchart indicating the steps associated with using a system which provides structured feedback forms, for providing feedback on a user interaction session with a computer software installation process. As seen in FIG. 6, a user initiates a software installation process on a computer, using a software installation program. Upon encountering difficulties in completing the software installation process, the user abandons the software installation process. The software installation program then prompts the user, requesting the user to submit relevant feedback. Upon agreeing to provide feedback, the software installation program then presents to the user a structured feedback form comprising feedback categories predefined by the software vendor. The user, in turn, selects a feedback category, and is preferably presented by the system with a list of feedback subcategories predefined by the software vendor. The user then selects a feedback subcategory, and submits relevant feedback. The user also submits user contact information. The system records the user's feedback and at a later time may display all aggregated user feedback to the software vendor.

Figure 7A:
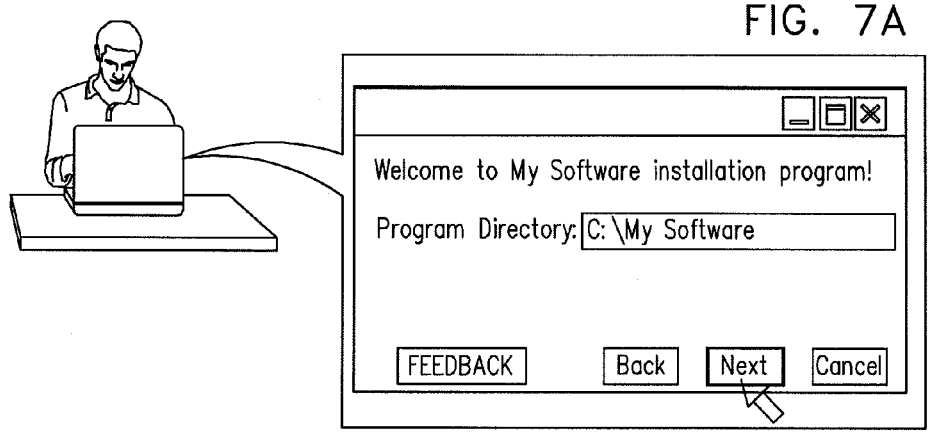
FIGS. 7A, 7B, 7C, 7D, 7E, 7F and 7G are simplified pictorial illustrations of steps in using a structured feedback form for providing feedback on another user interaction session with a computer software installation process.
Figure 7B:
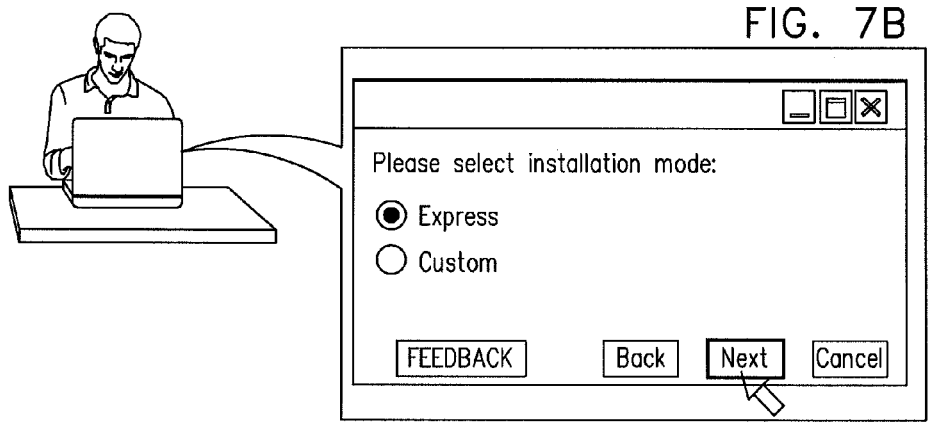
Figure 7C:
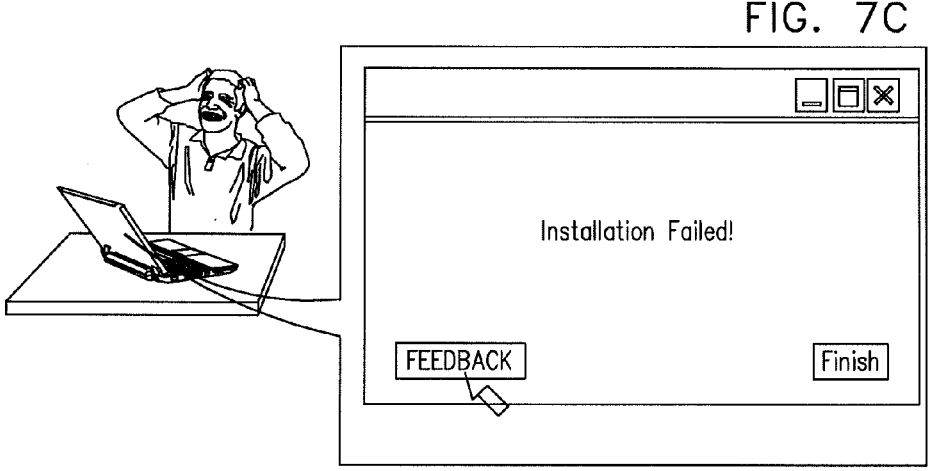
Figure 7D:
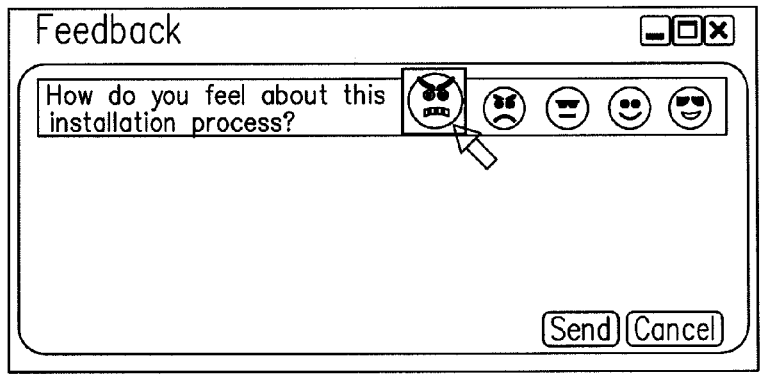

Reference is now made to FIGS. 7A, 7B, 7C, 7D, 7E, 7F and 7G which are simplified pictorial illustrations of steps in using a structured feedback form for providing feedback on another user interaction session with a computer software installation process. As seen in FIG. 7A, a user initiates a software installation process using a software installation program. After selecting the desired installation directory, the user continues the installation process by clicking on the "next" button. As seen in FIG. 7B, the user then selects the express mode of installation, and attempts to continue the installation process by clicking on the "next" button. However, as seen in FIG. 7C, the software installation program terminates and notifies the user that the installation program has failed to complete the software installation process, without stating a reason for the failure. The user then clicks on the "feedback" button, which causes the system to display a feedback form, as shown in FIG. 7D. As seen in FIG. 7D, the user selects to provide negative feedback regarding his experience with the software installation process.

Figure 7E:
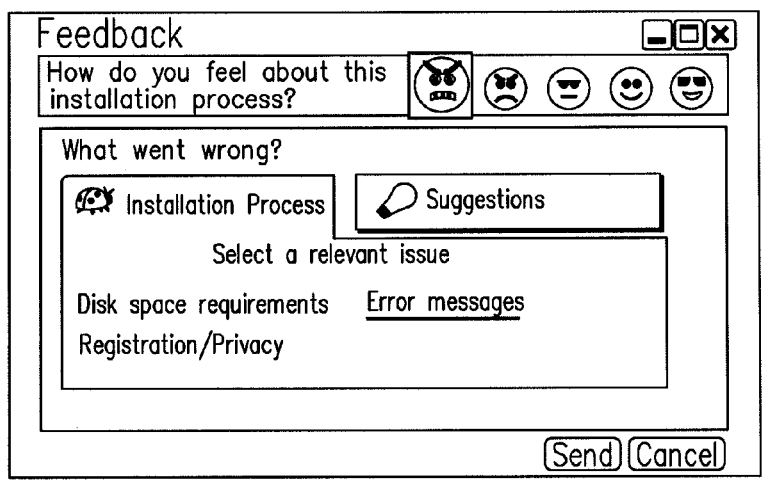

It is a particular feature of the present invention that the system provides the software vendor with the ability to generate categorized and nested structured feedback forms to be displayed in a software installation program for the purpose of collecting feedback regarding the user's experience while navigating through the software installation process. As seen in FIG. 7E, responsive to the user choosing to provide negative feedback regarding the user experience with the software installation process, the software installation program provides the user with a list of specific feedback subcategories from which he may from to more precisely describe his experience with the software installation process, such as feedback relating to installation process or general suggestions. The user selects the "Installation process" category, which includes various feedback subcategories, as shown in FIG. 7E. The user then selects the "Error messages" subcategory as the most relevant to the problems he has experienced.

Figure 7F:
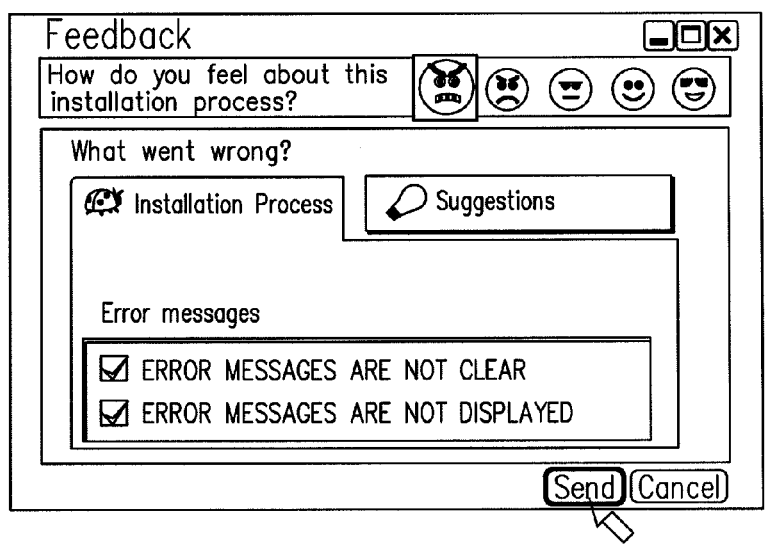
Figure 7G:
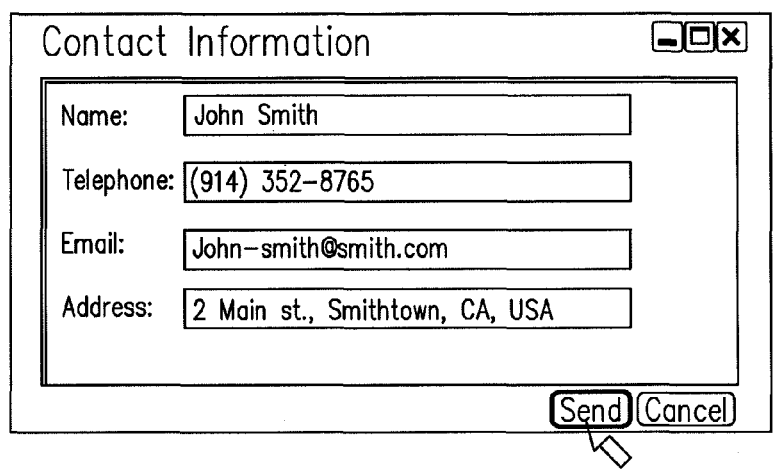

As seen in FIG. 7F, upon selecting the "Error messages" subcategory, the user may select the specific issue he has encountered, such as the lack of a stated reason for the failure of the software installation process. To complete the feedback process, the user clicks on the "send" button, after which the system displays a user contact information form to the user, as seen in FIG. 7G. The contact information form includes fields for entering user contact details such as name, telephone number, email address and address. The user feedback and user contact details are recorded by the system, and allow the software vendor to contact the user in reply to his feedback. The user contact details may also be used by the system to provide to the software vendor various statistics regarding user feedback.

Figure 8:
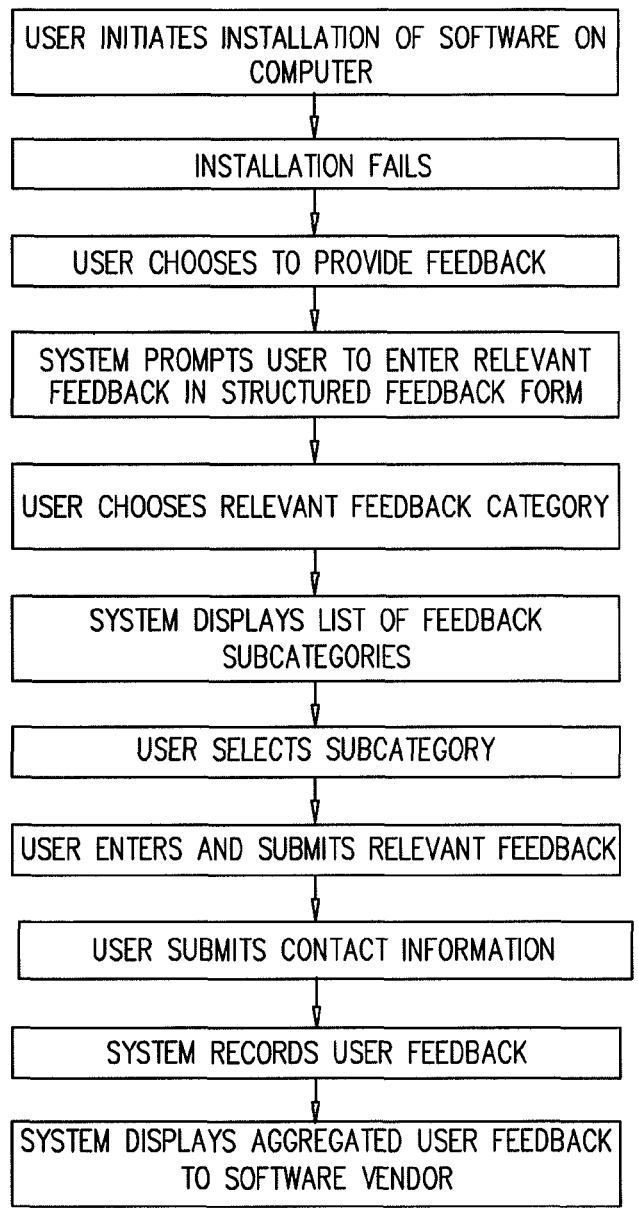
FIG. 8 is a simplified flowchart indicating steps associated with using a system which provides structured feedback forms, for providing feedback on another user interaction session with a computer software installation process.

Reference is now made to FIG. 8 which is a simplified flowchart indicating the steps associated with using a system which provides structured feedback forms, for providing feedback on another user interaction session with a computer software installation process. As seen in FIG. 8, a user initiates a software installation process on a computer. However, the installation process fails to complete successfully, and the user chooses to submit feedback to the software vendor. The software installation program then presents the user with a structured feedback form comprising feedback categories predefined by the software vendor. The user, in turn, selects a feedback category, and is preferably presented by the system with a list of feedback subcategories predefined by the software vendor. The user then selects a feedback subcategory, and submits relevant feedback. The user also submits user contact information. The system records the user's feedback and at a later time may display all aggregated user feedback to the software vendor.

Reference is now made to FIG. 9 which is a simplified block diagram illustrating the components of a system for collecting and analyzing structured user feedback on websites, constructed and operative in accordance with a preferred embodiment of the present invention. As seen in FIG. 9, the system is preferably managed by a website administrator and comprises a structured form generator which is operative to display structured forms to an end user using an end user interaction interface such as a web browser.

Structured forms that have been completed by the end user are collected by a structured feedback aggregator, and which provides aggregated feedback data to a structured feedback analyzer which is operative to display the aggregated feedback data to the website administrator in a variety of structured reports. The structured reports may be, for example, in the form of pie charts, graphs, tables and maps, and may display, for example, specific, administrator selectable feedback data typically sorted by category, by geographic location of the user or by date.

As seen in FIG. 9, the system also includes a user interaction module, which enables the website administrator to communicate with users who have provided structured feedback, by using the user contact information entered by the user as part of the structured feedback.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A computer system for collecting and analyzing structured user feedback on websites, said computer system comprising:

website user structured feedback form generation functionality operative to generate structured feedback forms for providing website user feedback on website user interaction with a website-based process, said structured feedback forms comprising user selectable feedback messages provided in a categorized and nested structure;

website user cancellation or abandonment prediction functionality operative to determine, based on a website action of a given user, that the given user intends to cancel a transaction associated with the website-based process or abandon the website-based process and, upon making said determination, automatically present the given user with at least one of the generated website user structured feedback forms or an invitation to enter feedback using at least one of the generated website user structured feedback forms;

website user feedback analyzing functionality operative to automatically collect and analyze website user feedback entered in said structured feedback forms and to provide at least one analysis report based on feedback from a multiplicity of website users, said at least one analysis report comprising a structured analysis report based on said categorized and nested structure; and a web analytics interfacing functionality operative to interface with a web analytics service and receive web behavior analysis relating to behaviors of the multiplicity of website users;

wherein, said automatic analysis of website user feedback includes factoring the received web behavior analysis in said automatic analysis and producing at least one analysis report that includes an integration of said received web behavior analysis wherein said analyzing functionality is further operative to analyze website user feedback in relation to each of two or more stages in the website-based process separately for each stage, factor into the stage specific analysis web behavior analysis relating to each of the two or more stages and report the results of the analysis in relation to the each of two or more stages separately for each stage.

2. The system of claim 1, wherein said website user structured feedback form generation functionality is operative to automatically provide structured feedback forms whose content depends on a stage in said website-based process currently being executed by the website user.

3. The system according to claim 1, wherein said website user structured feedback form generation functionality is operative to provide a plurality of structured feedback forms which correspond to a plurality of stages in said website-based process.

4. The system according to claim 1, wherein said website user structured feedback form generation functionality includes website specification functionality operative to permit a website administrator to design a plurality of structured feedback forms which correspond to a plurality of stages in said website-based process corresponding to a specific website.

5. The system according to claim 1, wherein said structured feedback forms do not include a freetext response item.

6. The system according to claim 1, wherein said web behavior analysis includes analysis of behaviors of the multiplicity of website users within the website-based process.

7. The system according to claim 1, wherein said website user feedback analyzing functionality is operative to automatically provide at least one analysis report which indicates proportions of website users who provide various pre-classified types of feedback at various stages in said website process.

8. The system according to claim 1, wherein said website user feedback analyzing functionality is operative to automatically provide contact information for website users providing feedback so as to enable said website administrator to respond to said feedback.

9. A method for collecting and analyzing structured user feedback on websites, said method comprising:
    generating, using a computer, website user structured feedback forms for receiving website user feedback on website user interaction with a website-based process, said structured feedback forms comprising user selectable feedback messages provided in a categorized and nested structure;
    determining, based on a website action of a given user, that the given user intends to cancel a transaction associated with the website-based process or abandon the website-based process;
    upon making said determination, automatically presenting the given user with at least one of the generated website user structured feedback forms or an invitation to enter feedback using at least one of the generated website user structured feedback forms;
    interfacing with a web analytics service;
    receiving from the web analytics service web behavior analysis relating to behaviors of the multiplicity of website users;
    automatically collecting and analyzing, using said computer, said website user feedback entered in said structured feedback forms including factoring the received web behavior analysis in said automatic analysis; and
    providing, using said computer, at least one analysis report based on said website user feedback from a multiplicity of website users, said at least one analysis report comprising a structured analysis report based on said categorized and nested structure,
    wherein at least one analysis report includes an integration of the received web behavior analysis; and
    wherein said automatic analyzing includes analyzing website user feedback in relation to each of two or more stages in the website-based process separately for each stage, factoring into the stage specific analysis web behavior analysis relating to each of the two or more stages and reporting the results of the analysis in relation to the each of two or more stages separately for each stage.

10. The method of claim 9, wherein said generating comprises automatically providing structured feedback forms whose content depends on a stage in said website-based process currently being executed by the website user.

11. The method according to claim 9, wherein said generating comprises providing a plurality of structured feedback forms which correspond to a plurality of stages in said website-based process.

12. The method according to claim 9, wherein said presenting the given user with at least one of the generated website user structured feedback forms or an invitation to enter feedback using at least one of the generated website user structured feedback forms includes using a push mechanism.

13. The method according to claim 9, wherein said structured feedback forms include a plurality of website user selectable items, whose selection by a website user indicates specific website user feedback.

14. The method according to claim 13, wherein said structured feedback forms do not include a freetext response item.

15. The method according to claim 13, wherein said structured feedback forms include a freetext response item.

16. The method according to claim 9, wherein said providing at least one analysis report comprises automatically providing at least one analysis report which indicates proportions of website users who provide various pre-classified types of feedback.

17. The method according to claim 9, wherein said providing at least one analysis report comprises automatically providing at least one analysis report which indicates proportions of website users who provide various pre-classified types of feedback at various stages in said website process.

18. The method according to claim 9, wherein said automatically collecting and analyzing comprises automatically providing contact information for website users providing feedback so as to enable said website administrator to respond to said feedback.

19. A method for collecting and analyzing structured user feedback on websites, said method comprising:
    generating, using a computer, website user structured feedback forms for receiving website user feedback on website user interaction with a website-based process, said structured feedback forms comprising user selectable feedback messages provided in a categorized and nested structure;
    determining, based on a website action of a given user, that the given user intends to cancel a transaction associated with the website-based process or abandon the website-based process;
    upon making said determination, automatically presenting the given website user at least one of said website user structured feedback forms or an invitation to enter feedback using at least one of the generated website user structured feedback forms;
    interfacing with a web analytics service;
    receiving from the web analytics service web behavior analysis relating to behaviors of the multiplicity of website users;
    upon the given website user completing one of said website user structured feedback forms, automatically presenting the given website user with a contact details form including fillable fields for collecting personal user data;
    automatically collecting and analyzing, using said computer, said website user feedback entered in said structured feedback forms and said personal user data including factoring the received web behavior analysis in said automatic analysis; and providing, using said computer, at least one analysis report based on said website user feedback and said collected personal user data from a multiplicity of website users, said at least one analysis report comprising a structured analysis report based on said categorized and nested structure;

wherein at least one analysis report includes an integration of the received web behavior analysis; and wherein said analyzing user feedback includes factoring at least a portion of said personal user data relating to the multiplicity of website users and analyzing website user feedback in relation to each of two or more stages in the website-based process separately for each stage, factoring into the stage specific analysis web behavior analysis relating to each of the two or more stages and reporting the results of the analysis in relation to the each of two or more stages separately for each stage.

* * * * *